Jan. 28, 1969   J. H. HERR ET AL   3,424,350
BOTTOM DISCHARGE FOR SILO

Filed April 28, 1967   Sheet 1 of 4

Fig. 1

INVENTORS.
JOHN H. HERR
AARON Z. STAUFFER
BY
ATTORNEY

Jan. 28, 1969    J. H. HERR ET AL    3,424,350
BOTTOM DISCHARGE FOR SILO
Filed April 28, 1967    Sheet 2 of 4

INVENTORS.
JOHN H. HERR
AARON Z. STAUFFER
BY
ATTORNEY

INVENTORS.
JOHN H. HERR
AARON Z. STAUFFER

BY

ATTORNEY

3,424,350
BOTTOM DISCHARGE FOR SILO
John H. Herr, R.D. 4, Lebanon, Pa. 17042, and Aaron
 Z. Stauffer, Rte. 1, Ephrata, Pa. 17522
Filed Apr. 28, 1967, Ser. No. 634,543
U.S. Cl. 222—63                          9 Claims
Int. Cl. B65g *43/00, 33/10*

ABSTRACT OF THE DISCLOSURE

A silo arranged for bottom unloading by means of agitating mechanism in the lower portion operated by a rotatable shaft to feed loosened material to impeller discharge means, and vacuum pump means connected to the interior of the silo reduce the pressure therein to below atmospheric pressure to compact the material therein and preserve maximum total digestive nutrients.

BACKGROUND OF THE INVENTION

The storing of silage in a manner to maintain the maximum level of total digestive nutrients, known in the industry as T.D.N., has posed many problems since the early development of silos. For purposes of this invention, it is to be understood that silage encompasses the whole stalk of any grain material, legumes, and grass materials which are cut while in the green state, when the T.D.N. is at its highest level. The problem comprises storing such silage with minimum spoilage and decrease in the T.D.N. level. The invention also pertains, however, to the storage of high moisture grain such as that which is newly harvested by a combine.

According to existing principles which have been followed for a number of years, it is customary to introduce atmospheric air into the silo when being filled. According to some principles, it is believed desirable to maintain air within the silo substantially at atmospheric pressure at all times. When the silo is being filled with chopped, green silage, the air introduced therewith commences to ferment the material and causes an increase in the pressure of gases within the silo. The oxygen of the air is quickly absorbed by the plant cells and after a few hours, large quantities of $CO_2$ commence to evolve and have the effect of purging out any remaining air in a substantially airtight silo in order to prevent the promotion of mold growth. Other attempts to minimize the propagation of mold and minimize fermentation have included the introduction of exhaust gases from an internal combustion engine directly into the silo, primarily for purposes of minimizing the oxygen content and correspondingly reduce fermentation.

Further in accordance with conventional practice, the introduction of silage into a silo should be accompanied with a desired proportion of moisture in order to compact the material and thus minimize the occurrence of air within the silage when the silo is loaded therewith. Under conditions when the silage is relatively dry, it is accepted practice to add water thereto at the time of filling a silo. Such silage, for example, has a moisture content of as high as between 70 and 80 percent but moisture content of this range greatly reduces the neutrative value. Further, the moisture, which separates in the form of juice, corrodes the inner surface of silos especially when formed from metal inasmuch as such juices are highly corrosive, the same containing a high percentage of acetic acid. Even cement silos also are substantially attacked chemically by said juices. Further, such juices largely gradually drain from the lower portion of the silo and run off to waste.

It is known that silage has its highest nutritive value, other circumstances being equal, when it has a moisture content of between 25 and 30%. The nutritive value is less if the moisture content is substantially below said range as well as if the moisture content is substantially greater than said range.

Attempts to provide maximum advantages in storing silage in silos have resulted in the provision of silos which are sealed at the top in various ways and provided with means in the bottom thereof for discharging the silage therefrom. It is normal in most operations, especially in dairy farms, to discharge silage from the silos twice each day, substantially at twelve hour intervals, for purposes of feeding the milk cows and cattle such as steers.

Each time a silo is discharged under such circumstances, atmospheric air has an opportunity to enter the interior of the silo and this promotes additional, though somewhat limited, fermentation and thereby increases the propagation of spoilage of the contents. Thus far, no effective means have been provided to avoid this occurrence.

SUMMARY OF THE INVENTION

It is the principal object of the present invention to provide a silo arranged for bottom unloading, the unloading means being of novel construction and combined with means to reduce the pressure within the sealed interior of the silo to a level below atmospheric, whereby the same is of a negative, vacuum nature. Discharge of material from the silo is accomplished by mechanism which minimizes the ingress of atmospheric air and, on the contrary, actually facilitates the maintenance of a negative pressure within the silo. Further, the negative pressure within the silo may be regulated in several different ways in accordance with the principles of the invention.

One way of regulating the pressure within a silo comprises producing an interior atmosphere of a desired vacuum level at the time of loading the silo and also after each discharge of material therefrom, while a second way comprises the automatic maintenance of a negative atmosphere within the silo under all conditions of storage and discharging operations within predetermined maximum and minimum levels regulated by control mechanism that functions to initiate and stop the operation of pump means associated with the silo for purposes of producing such negative atmosphere therein.

By the foregoing arrangements and methods, plant cell respiration, or the oxidation of natural plant sugars ceases, thereby terminating the principal cause of heating and corresponding "cooking" of vitamins and proteins such as carrotene which naturaly occurs within silage and is of great value for purposes of furnishing maximum nutrition for animals consuming the same. Further, aerobic bacterial fermentation ceases under such conditions and the available plant sugars are utilized to produce a high concentration of stable lactic acid which, in turn, controls the further bacterial growth and thereby effectively preserves the maximum nutritive values of the silage.

The elimination of air likewise prevent the occurrence of mold, slime, and fungus growth which primarily accounts for considerable waste in silage produced by conventional means. The arrangements afforded by the present invention thus maintain the stored silage material in a condition which most nearly corresponds to its original feeding value such as at the time the silage was harvested and the digestible nutrient is maintained at as high a level as possible.

A further advantage of the present invention resides in the fact that as much as between 20 and 30% more material may be stored in a given structure through the use of negative, vacuum atmospheres within the ranges contemplated by the present invention as compared with conventional procedures, depending upon the moisture content of the material. In this regard, it is a further object of the invention that the moisture content of the material is maintained at a level below that at which, within the desired vacuum ranges, moisture would be withdrawn from the mass of stored material.

Further in accordance with the present invention, the discharge apparatus which operates at the bottom of the silo is such that it can be operated at normal times or the upper portion of the structure can be reopened for additional filling without harm to the previously stored and processed silage or the loss of palatability thereof, due particularly to the facilities provided by the invention for maintaining the interior atmosphere within predetermined negative pressure limits which may be produced quickly and, preferably, maintained automatically. In this regard, the discharge of material from the partially evacuated interior of the silo may be accomplished while preventing atmospheric air from entering to any noticeable extent.

Further in accordance with the principles of the present invention, it is another objective of the invention to line preferably the interior of the silo with an impervious, moisture-proof sheet-like material positioned adjacent the inner surface of the silo and extending across the top thereof in air-tight manner, though being capable of being opened at the top for filling of the silo, followed by sealed closing of the filling opening, whereby the moist silage within the silo does not contact the inner surface of the walls thereof and thus preserves the walls of the silo from deterioration by any contact with such moisture or normal liquid within the silos as occurs in conventional silos and results in extensive deterioration of the wall structures and mechanism therein, regardless of whether formed from cement or metal. Other advantages and objectives of the invention are set forth in the following specification and illustrated in the accompanying drawings comprising a part thereof.

DESCRIPTION OF THE PREFERRED EMBODIMENTS

Figure 1:
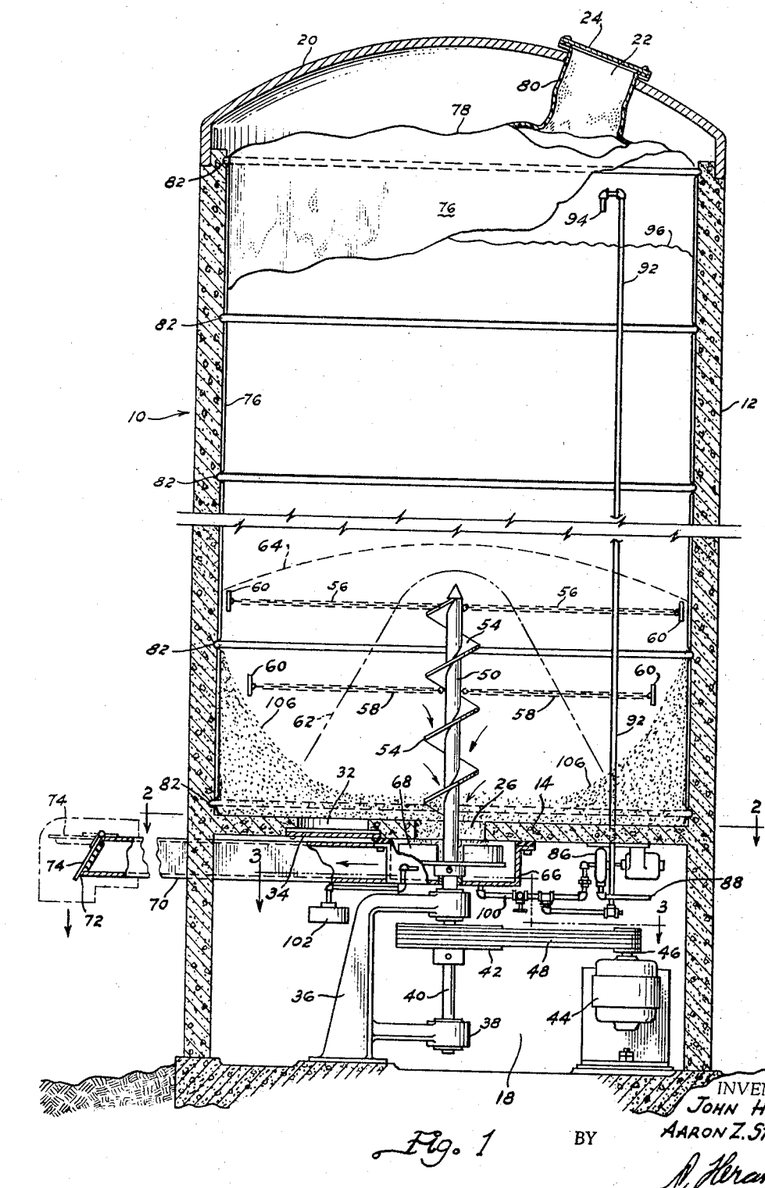
FIG. 1 is a side elevation, partly in vertical section, of an exemplary silo embodying the principles of the present invention and arranged in operative position, the shell of the silo being foreshortened to readily adapt the ilustration to the sheet.
Figures 2, 3, 4, 5:
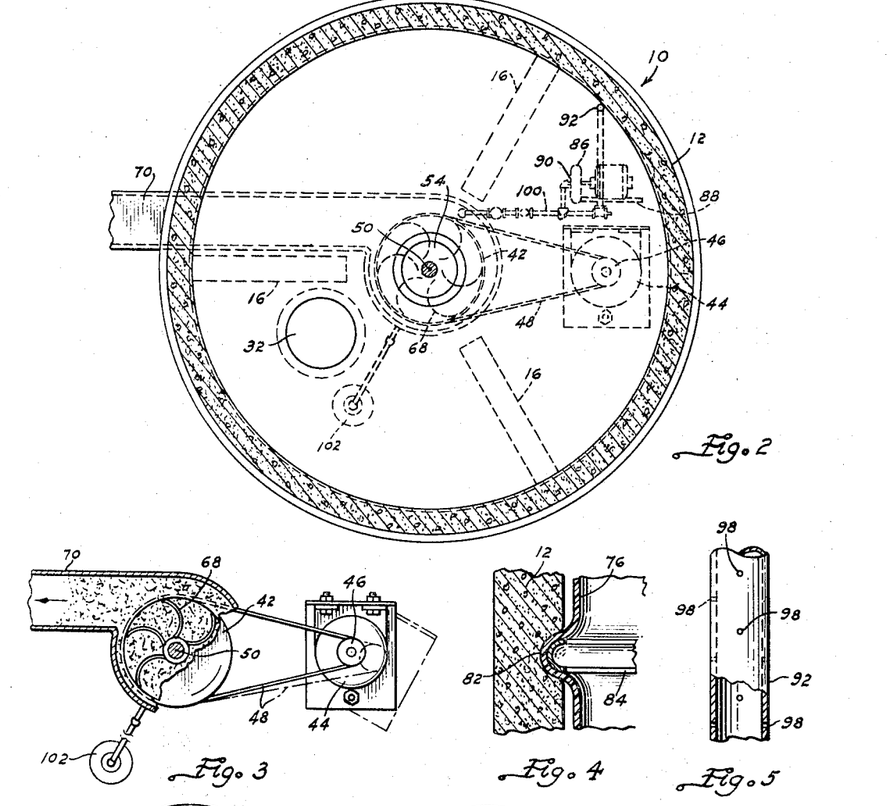
FIG. 2 is a horizontal vertical section of the silo shown in FIG. 1 as seen on the line 2—2 of said figure.
FIG. 3 is a fragmentary horizontal sectional view of a portion of the silo shown in FIG. 1 as seen on the line 3—3 of said figure.
FIG. 4 is a fragmentary vertical sectional view showing a detail of a portion of the silo wall and illustrating the preferred method of attaching lining material thereagainst.
FIG. 5 is an enlarged fragmentary elevation of a partially sectioned air-removal tube of the type shown in FIG. 1 for purposes of reducing the pressure in the silo shell.

Referring to FIGS. 1 and 2, it will be seen that the silo 10 comprises a preferably cylindrical shell 12 of substantally uniform diameter and supported vertically with respect to the ground or other supporting means. As illustrated in FIG. 1 in particular, it is preferred that the bottom wall 14 be supported by pillars or radial wall-like members 16, or the like, above ground level, or, if preferred, an appropriate recess be made in the ground in the event it is desired to have the bottom wall 14 supported substantially at ground level or possibly within the ground a sufficient distance to be below frost level. To best serve the present invention, however, it is preferred that a cavity 18 be provided by one means or another beneath the bottom wall to accommodate certain portions of the discharge mechanism, power drive, and control mechanism.

The walls of the shell 12 may be formed of a number of different types of material such as used at present, including reinforced concrete, sheet metal such as steel or aluminum, industrial tile, or otherwise. The upper end of the shell 12 is surmounted by a cover or top 20 of suitable weatherproof material and may be either substantially unitary or fabricated from sectional pieces. The top 20 also is provided wth an appropriate filling opening 22 having a sealing cover or closure 24 operable to close the same. Conventional means may be utilized to preferably seal the cover 24 relative to the opening 22, gasket means usually being employed. The bottom wall 14 preferably is formed from poured, reinforced concrete for both strength and durability and suitably treated to be impervious to liquid. Sheet steel or otherwise may be used in lieu of concrete, if desired. The bottom wall 14 also is provided with a preferably central discharge opening 26.

It will be understood that under normal circumstances, the average diameter of the shell 12 will be of the order of 15 or 20 feet and the discharge opening 26 will be within the range of between 2 and 3 feet. For purposes to be described hereinafter, an access opening 32 preferably is formed in the bottom wall in a location, such as shown in FIG. 2, which does not interfere with the other mechanism adjacent the bottom wall, to be described hereinafter. Access opening 32 normally is sealed by an appropriate cover 34. The cover 34 may be connected across opening 32 by any appropriate means such as bolts or the like.

Appropriate supporting means such as a frame 36 is provided with a plurality of vertically spaced bearings 38 which receive the lower end of a substantially vertical shaft 40 and comprises an essential part of discharging mechanism which consists of a number of elements to be described hereinafter, certain of which are closely associated with the shaft 40. Shaft 40 is provided with a suitable sheave 42 and a motor 44 of suitable horsepower is mounted within cavity 18 opposite shaft 40, the same having a drive sheave 46 thereon. Suitable belt drive means 48 extend around the sheaves 42 and 46. The sheaves and drive belt may be of any suitable type such as V-belts, or, if preferred, sprocket gears and a sprocket chain may be used in lieu thereof.

Figure 21:
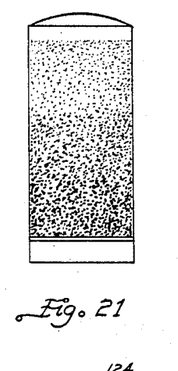
FIGS. 21 and 22 respectively are exemplary vertical sectional views of the interior of silos filled with silage introduced into the silos respectively by conventional means and the means comprising the present invention, said views further respectvely illustrating variable density and substantially uniform density of the contents throughout the heights of the silos.
Figure 22:
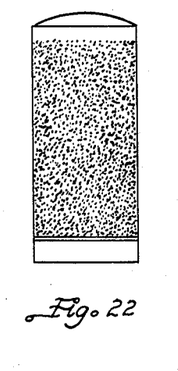

The preferred basic principle for discharging silage material and the like from the silo 10 in accordance with the present invention, comprises discharging the material through the bottom, the opening 26 being for such purposes. Under normal circumstances, the material stored within the silo 10, particularly when the same is filled or nearly filled, will have a total weight amounting to quite a number of tons. Further in accordance with the principles of the invention, it is preferred that said material be relatively compact, substantially uniformly, throughout the entire mass, as illustrated in exemplary manner in FIG. 22, as distinguished from graduated density which is heaviest at the bottom, as represented diagrammatically in FIG. 21 with respect to conventional practice.

Such preferred uniform density adds even further to the total weight of the mass within the silo 10, especially when the same is substantially filled. To provide for ready and preferably automatic discharge or unloading of the silo, periodically, such as twice a day, through the discharge opening 26, a number of embodiments of agitating, separating or loosening mechanisms are provided by the present invention, details of which are illustrated in various figures and are described hereinafter.

For ease of operation and maximum efficiency, it can be appreciated that with the relatively compact, uniform density of the stored mass referred to above, any agitating mechanism operable in the lower portion of the silo must be of such type as to effect a limited initial amount of agitation and separation or disintegration of the material for discharge, followed by increasing amounts being separated as the agitation progresses incident to any particular period of discharge which is undertaken. The embodiment of agitating mechanism illustrated in FIGS. 1 and 8 comprise a substantially central, vertical shaft 50 which may either be a continuation of drive shaft 40 or be connected thereto such as by a coupling 52 as shown in exemplary manner in FIG. 8. Under normal conditions of operation contemplated by the invention, the speed of rotation of said shaft is of the order of approximately 250 r.p.m. but this speed is not to be considered restrictive. The speed reduction afforded by the different diameters of the sheaves 42 and 46 readily produces the desired speed without necessarily employing a speed reduction unit on motor 44, though such may be used if desired.

Figures 8, 9, 10, 13, 14:
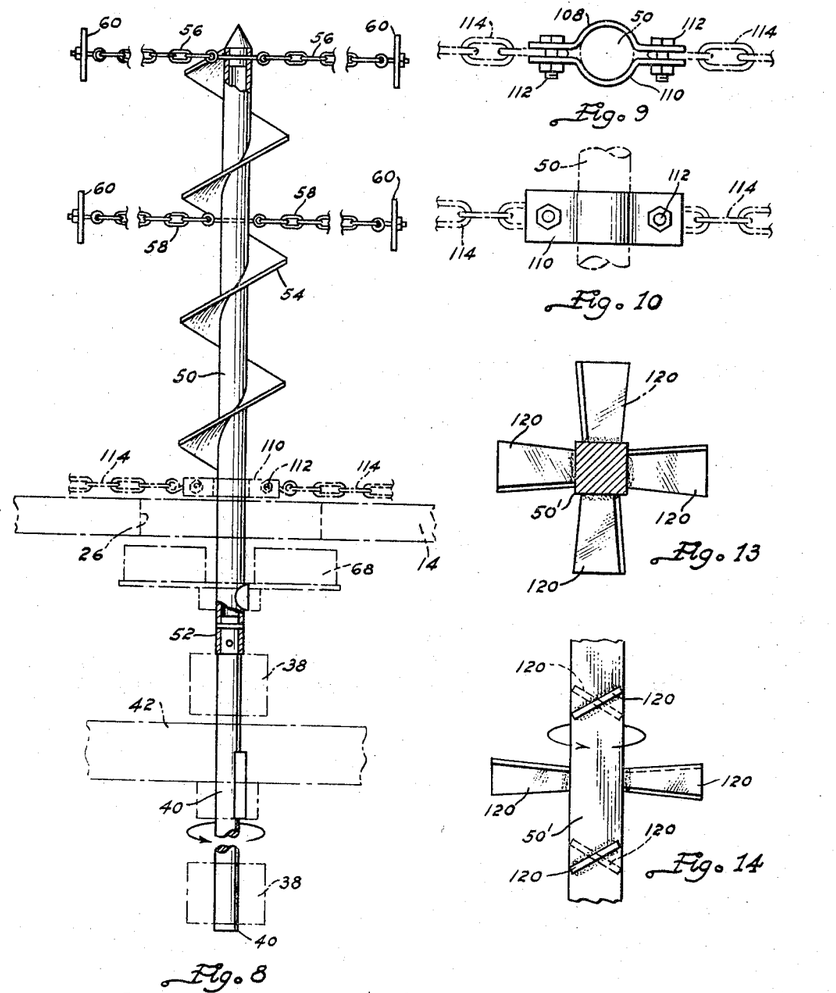
FIG. 8 is a fragmentary, vertical elevation, partly in section, illustrating one embodiment of discharge means for the lower portion of the silo shown in FIG. 1, the same being illustrated on a large scale than employed in FIG. 1.
FIGS. 9 and 10 respectively are fragmentary plan and side elevations of one embodiment of mechanism for attaching the agitating chains of the type shown in FIG. 8 to the shaft of the discharge means shown in FIGS. 1 and 8.
FIGS. 13 and 14 respectively are a horizontal sectional plan view and fragmentary side elevation of another embodiment of auger-type means from the embodiment shown in the discharge means illustrated in FIGS. 1 and 8.

From FIG. 1 in particular, it will be seen that the shaft 50 extends upwardly through the discharge opening 26 toward the top of the shell 10 a limited distance, which, preferably, is of the average order of between 8 and 12 feet. The shaft also may be either solid or hollow and preferably of the order of at least four or five inches, though this dimension is not to be regarded as restrictive. In the embodiment of FIGS. 1 and 8, a continuous helical flight type auger means 54 is carried by shaft 50, said auger being of appreciable diameter, such as of the order of 15 or 20 inches for example, particularly if the diameter of the shell 12 is of the order of 15 or 20 feet, and the pitch of the auger is relatively coarse, being approximately of the order of the diameter thereof. The motor 44 drives the auger unidirectionally in a rotary direction which will urge the material downward through the discharge opening 26.

Suppermentary agitating means preferably are associated with the auger 54, one embodiment of the same comprising a plurality of chains 56 and 58 of suitable size, chains 56 being of a length preferably slightly less than the radius of the interior of shell 12, while the length of chains 58 are less than chains 56. Preferably, the chains terminate in suitable heads 60 which facilitate the digging or loosening of the material from the compacted mass during rotation of the shaft 50 and the discharge mechanism associated therewith. Said heads also have sufficient weight to initiate outward movement of the chains 56 and 58, by centrifugal force, from an initial depending position.

The supplementary agitating means, including all embodiments proposed by the present invention, preferably are of the type that, when disposed in inoperative position, depend in close proximity to the axis of shaft 50 or at least along the periphery of auger means 54. Accordingly, upon the initiation of operation of the agitating means, it can be appreciated that the mass of material within the shell 12 has lowered, due to gravity, since the termination of the preceding removal of a batch of said material and usually has become even highly compacted around the agitating means. Nevertheless, said agitating means is such that because of the initial very limited diameter thereof, rotation of the same within the mass can be achieved with much less starting power being required than under conditions where the agitating mechanism extends initially horizontally across substantially the full radius of the silo as in various types of conventional mechanisms resorting to bottom unloading of silos.

Following the initiation of rotation of shaft 50 and the auger 54 which under such conditions will have the chains 56 and 58 draped therealong, the agitating means will gradually feed the material immediately contacting the same through the discharge opening 26 and, as rotation continues, centrifugal force will tend to move the chains 56 and 58 outwardly so that as the rotation progresses, a configuration within the bottom of the mass somewhat as represented by the dotted line 62 in FIG. 1 will occur. Still further rotation will result in the chains 56 and 58 assuming substantially horizontal position as shown in exemplary manner in FIGS. 1 and 8, with the result that a somewhat concave bottom surface will be formed in the mass as represented diagrammatically by the broken line 64.

Notwithstanding the fact that the compacted material within the silo tends to bridge over as illustrated in exemplary manner by the line 64, when this occurs, the weight of the mass above said lower surface substantially is such that the entire mass will commence to move downwardly by gravity. This will present additional material into which the chains 56 and 58 will penetrate, particularly in the event that the foregoing operations have not resulted in discharging an adequate amount of material through the discharge opening 26. Operation of the discharging mechanism thus is continued until the needed amount of material has been discharged.

While the agitating means such as the auger 54 and the supplementary means 56 and 58 will result in highly effective separation and comminution of the previously compacted material, it is preferred that the present invention utilize additional discharge mechanism in the form of a preferably short, cylindrical discharge housing 66 which may be formed from sheet metal or the like and secured to the lower face of bottom wall 14 by any suitable means. The diameter of said housing preferably is somewhat greater than the opening 26, especially for purposes of accommodating an impeller 68 which may be fixed to and driven by shaft 50, or at least rotated about the axis of said shaft and if desired to operate the impeller at a greater speed than that of shaft 50, the impeller may be driven by additional drive means, not shown, at the preferred speed, such as by a hub depending from the lower end of said impeller.

The impeller 68 comprises a plurality of vanes preferably evenly spaced circumferentially about a hub fixed to shaft 50. The vanes may be either curved or straight as illustrated in FIGS. 2 and 3. The impeller 68 is rotated in the direction of the arrow shown in FIG. 3 within the discharge housing 66 from which a discharge conduit 70 projects tangentially as shown in FIGS. 2 and 3. This arrangement results in the impeller 68 providing two principal functions. One is to further facilitate the decimation of the material being discharged and the other is to impel the material in a steady stream through the discharge conduit 70 to the terminal end 72 thereof shown in FIG. 1. Said end preferably is covered by closure 74 which is hingedly connected at the upper edge thereof to said terminal end so as to normally close by gravity. If desired, appropriate seal means may be used in order that when the closure is in sealing engagement with the outer end of conduit 70, no appreciable ingress of atmospheric air can occur. However, when material is being discharged as a result of operation of impeller 68, the stream of exiting material will be adequate to force the closure 74 to open position automatically, especially if the closure is of relatively light-weight, or the closure may be opened manually and otherwise suitably supported in open position during discharge of material from conduit 70, if desired.

In the preferred construction of the silo system comprising the present invention, the inner surface of the cylindrical shell 13 is covered by an impervious, sheet-like liner 76 which may be formed from appropriate synthetic resin or plastics of which a number of commercial types are available, such as polyethylene. Such material and suitable equivalents are thermoplastic and edges of adjacent large sheets thereof readily may be fused to each other so as to provide a completely impervious liner covering the entire inner surface of shell 12 upward from bottom wall 14 and also extending across the top thereof. The liner top 78 preferably has a suitable tubular inlet throat 80 of similar material sealed thereto and the upper end thereof being appropriately affixed around the perimeter of the filling opening 22 in the top 20 of shell 12. Accordingly, when the closure 24 is in seating engagement with the perimeter of filling opening 22, no ingress of atmospheric air will occur through the throat 80. The lower end of the liner 76 preferably is suitably affixed against the bottom wall or floor 14.

One highly suitable means for attaching the sheet-like liner 76 to the inner wall of shell 12 comprises, for example, forming a series of annular recesses 82 of suitable size within the inner surface of shell 12, at appropriate vertically spaced locations. After arranging the liner 76 in operative position within the shell 12, such as by temporarily supporting the upper end of the same by any suitable means, appropriate circular clamping bands 84 of any suitable material and construction are provided with respect to each annular recess 82 for purposes of engaging the inner surface of the liner 76, as shown in exemplary manner in FIG. 4, and forcing the same into the recesses 82 in clamped manner adequate to hold the liner 76 in operative position.

The clamping bands 84 preferably are formed from or coated with suitable material to withstand attack by either the moisture content, acids, or otherwise of the material to be stored within the silo. It also will be appreciated that the compacted mass of material within the silo will be fully adequate to hold the liner 76 radially against the inner surface of shell 12. However, as the material is discharged from the cylinder 12, and is removed from the liner 76 gradually from the top downward, the supporting means just described will function to maintain the liner in operative position.

In addition to the particular advantages of the discharge mechanism described above and certain additional embodiments of which will be described hereinafter, another major advantageous provision of the present invention comprises mechanism to produce and preferably continuously maintain within the material stored within the shell 12 an atmosphere of negative pressure sufficiently below that of atmospheric that the resulting partial vacuum thereby produced within the stored material and any unfilled volume within the shell 12, such as between the liner top 78 and top of the mass of material therein, will include no appreciable amount of air. As a result, the conversion or depletions of natural plant sugars will cease, maximum preservation of vitamin and protein content will occur, and no appreciable aerobic bacterial fermentation will take place, whereby concentration of stable lactic acid will result to provide a control against any further bacterial growth and thereby effectively preserve the silage in maximum nutritive condition, while the occurrence of mold, slime and fungus growth is substantially prevented or eliminated. In short, the total digestive nutrients, frequently referred to as T.D.N., are maintained at a maximum level. High moisture content grain, such as grain newly harvested by a combine, may be stored in a silo under such negative pressure conditions without additional drying being required, as is now necessary with current storage techniques, and no molding or other deleterious conditions result. To accomplish these results, the lowest vacuum level should be no less than ¼" of mercury and the upper limit may be considerably greater but never so great as to withdraw moisture from the material through the evacuating system.

One suitable mechanical arrangement for producing such desired reduction in pressure within the silo 10 comprises a system composed of a pump 86 having inlet and discharge means, the discharge means 88 leading to atmosphere, while the inlet means 90 communicate, for example, with the lower end of a preferably perforated suction-creating tube 92 which preferably extends upwardly within the interior of shell 12, terminating at the top thereof in an air inlet end 94 which is adjacent the liner top 78, for example, especially for purposes of effectively reducing the pressure within the space normally occuring between the liner top 78 and the top surface 96 of the mass of material within the shell 12.

Figure 20:
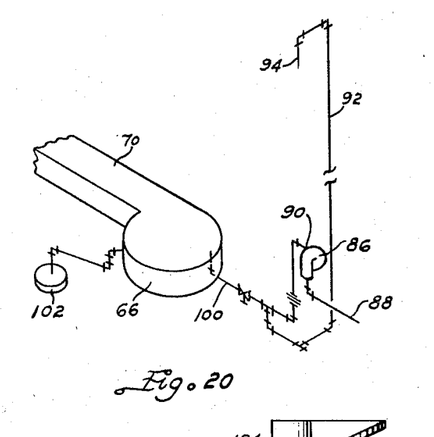
FIG. 20 is a diagrammatic illustration of a preferred embodment of evacuating system for use with the exemplary silo system shown in FIG. 1.

Details of said system are illustrated best in FIGS. 1 and 20. Referring to FIG. 5 however, it will be seen that the tube 92 is provided with a substantial number of vertically and circumferentially spaced perforations 98 which are of very small size, such as of the order of $\frac{1}{32}$ or $\frac{1}{16}$ of an inch in diameter. In this regard, the material normally intended to be contained within the shell 12 is sufficiently coarse that such size of perforations will not be appreciably clogged by the material even though the same surrounds the tube 92, as is preferred in operation. Preferably, however, particularly the lower portion of the tube 92 is disposed closely adjacent the inner surface of the shell 12 and liner 76 so that the revolving terminal ends of the agitating members 56 or 58 will not contact the tube. Also, if found necessary, a plurality of such tubes 92 may be provided and appropriately connected at the lower ends thereof, for example, to the inlet 90 of pump 86, such as by a manifold pipe or otherwise.

Further, particularly for purposes of minimizing if not absolutely preventing the possibility of atmospheric air from entering the interior of shell 12 during the discharging operations through the conduit 70, it is also preferred that appropriate suction inlet conduit means 100 communicate either at one or more locations with the walls of discharge housing 66, the inlet openings preferably being covered with appropriate wire mesh or gauze of small size openings comparable with the size of perforations 98.

While the application of vacuum suction to the material and space within the shell 12 may occur, for example, at the time of filling the silo and also during or following each discharge of material therefrom, it also is within the purview of the present invention that a predetermined range of negative pressure be maintained within the shell 12 at all times, within desired minimum and maximum limits. Providing a negative pressure during or just after filling the silo greatly increases the amount which can be stored due to compacting the same. This is accomplished, for example, by having a control 102 of suitable commercial type responsive to vacuum or negative pressure changes within any critical location either within or communicating with the interior of the shell 12.

By way of example, a suitable location for control 102 comprises the wall of the discharge housing 66. This is highly suitable for purposes of automatically controlling the operation of the motor connected to said pump. Thus, when the negative pressure within the shell 12 reaches a predetermined maximum upper limit, which preferably is still below atmospheric pressure, operation of pump 86 is initiated and this continues until the pressure is reduced to a predetermined lower limit, as controlled by the setting of control 102, at which time the pump stops. Control 102 preferably is adjustable as to both the upper and lower limits at which it functions. Due particularly to the fact that the interior shell 12 is substantially hermetically sealed during all conditions of operation excepting when discharge through conduit 70 is occurring, maintenance of a desired negative pressure within the container 12 may be achieved at relatively low cost, particularly since the discharge end 72 of conduit 70 is sealed by closure 74 when discharge is not occurring.

From the foregoing, it will be seen that the present invention accomplishes two beneficial, primary objectives which are interrelated and interdependent for purposes of preserving stored agricultural product material within a silo under conditions where maximum nutritive value is maintained. One is to maintain the material highly compacted and as free from air as possible. The other objective is that when discharge of desired quantities of said compacted material is desired, such discharge occurs by appropriately agitating desired quantities of the compacted material in such a manner that it is disintegrated sufficiently for ready consumption by animals to be fed thereby, for example, but such discharge occurring under conditions which permit the entry of no appreciable quantity of atmospheric air and even of small quantities thereof gain access to the interior of the shell, the same is substantially immediately withdrawn before any adverse effect can take place within the stored material. The foregoing apparatus is well suited to achieve both of these objectives.

Referring to the dislodging members of the embodiment shown in FIGS. 1 and 8 comprising chains 56 and 58, it will be seen that the operation of this arrangement of chains alone will result in a somewhat bowl-shaped configuration of material remaining in the bottom portion of shell 12, as indicated by the curved broken line 108. Such an arrangement somewhat serves as a funnel to facilitate the discharge of the separated and at least partially disintegrated material through the opening 26. However, if it is desired to remove this accumulated material from the actual bottom of the shell, such as each time a batch of material is discharged therefrom, auxiliary dislodging means of the type shown in FIGS. 8–10 may be resorted to. The exemplary embodiment thereof shown in these figures comprises a pair of metallic clamping straps 108 and 110 having arcuate central portions which, for example, may be connected together at the ends thereof by bolts 112, said bolts further passing through the end links or other connecting means on additional extendable dislodging chains 114 of a length no greater than the chains 58 for example. Particularly from FIG. 8, it will be seen that these chains are disposed adjacent the upper surface of the bottom wall 14, whereby the same effectively will prevent any apreciable amount of material accumulating adjacent the bottom wall in any continuous manner except between discharging operations.

Figure 11:
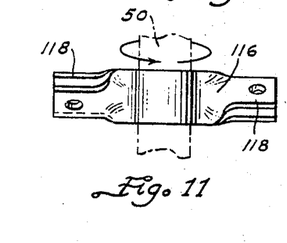
FIGS. 11 and 12 respectively are side and end views of another embodiment of attaching means from that shown in FIGS. 9 and 10 for purposes of securing supplemental agitating chains to a shaft of the discharge means shown in FIGS. 1 and 8.
Figure 12:
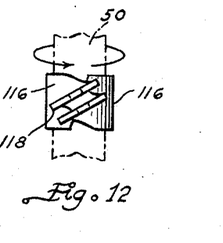

Referring to FIGS. 11 and 12, still another embodiment of attaching means for auxiliary dislodging members, such as chains 114 may be provided. The further exemplary illustration thereof shown in Figs. 11 and 12 comprises a pair of similar transversely extending straps 116 having arcuate intermediate portions complementary to the exterior of shaft 50, opposite sides of which are engaged by said portions. The terminal end 118 of said straps are twisted in opposite directions approximately 45° and are spaced apart to receive therebetween one end of such additional dislodging members such as chain 114 shown in FIGS. 9 and 10, the same being secured thereto by bolts passing through the aligned holes formed in said oppositely twisted ears 118 as shown in FIGS. 11 and 12.

Rather than employing a continuous spiral flight type auger means 54 of predetermined legnth, such as shown in FIGS. 1 and 8, if desired, substitute means may be employed which may provide a greater disintegrating effect than the auger 54. A suitable example of such substitute means is illustrated in FIGS. 13 and 14. wherein it will be seen that at least the portion of the shaft 50' which supports said means may be substantially square in cross-section as shown in FIG. 13. Relatively stubby bladelike members 120 of suitable length may be affixed at one end, such as by welding, to the various faces of the shaft 50'. Preferably, pairs of said blades may be affixed in opposite transverse relationship to each other but reversely sloping.

The entire arrangement of blade members 120 preferably comprises interrupted sections of a continuous spiral-like structure. Hence, when the shaft is rotated in the desired direction to effect downward feeding of material as in regard to the operation of the continuous spiral 54 of FIGS. 1 and 8, not only will effective downward movement be achieved but additional disintegration of the material will occur due to the separation of the successive blades 120 from each other. Also, in the preferred construction, the bladed arrangement shown in FIGS. 13 and 14 is supplemented by radially extendable dislodging means such as chains of the type shown in the preceding figure.

Figures 15, 16, 18:
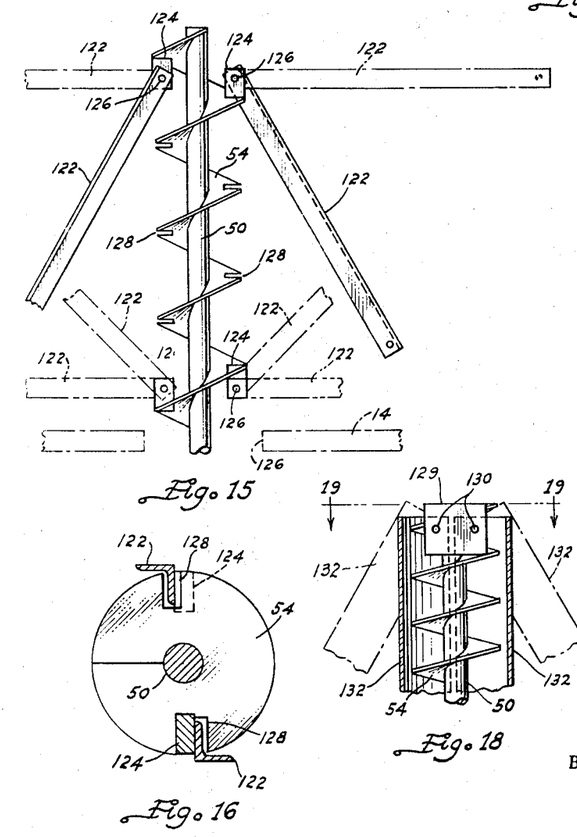
FIG. 15 is a side elevation showing fragmentarily still another embodiment of agitating mechanism for discharge means capable of being utilized in the lower portion of the silo shown in FIG. 1, said view illustrating in full lines one position of the agitating means, while in phantom, a reverse position thereof is shown.
FIG. 16 is a transverse sectional plan view of the embodiment of agitating mechanism shown in FIG. 15 to illustrate the relative position of the agitating arms with respect to the auger when disposed in inoperative position.
FIG. 18 is a fragmentary vertical sectional view of still another embodiment of agitating mechanism than those shown in the preceding figures for use in discharge mechanism for a silo of the type shown in FIG. 1.

Further embodiments of radially extendable dislodging members which may be used in lieu of the chains shown in FIGS. 1 and 8–10 are illustrated in FIGS. 15–19. Referring to the embodiment shown in FIGS. 15–17, it will be seen that the shaft 50 has a continuous spiral flight 54 secured thereto as in regard to the embodiment of FIGS. 1 and 8. However, several positions for arranging radially extendable dislodging members 122 are shown in FIG. 15. In cross-section, the members 122 preferably comprise suitable lengths of angle structural members, as shown in FIG. 16, which sometimes are referred to as angle irons. The length is preferably slightly less than the radius of the inner surface of shell 12.

Appropriate pivot brackets or bracket blocks 124 preferably are fixed to the flight 54 adjacent opposite ends thereof, as shown in FIG. 15, for pivotally connecting one end of one flange of the members 122 thereto by suitable bolts or pins 126. When the members 122 are in respose, they will depend downwardly and the auger flight 54 preferably has a series of vertically aligned slots 128' thereon to accommodate the flanges which are pivotally connected to the brackets 124. When the shaft 50 is rotated, the members 122 gradually will pivotally move upwardly until they ultimately reach the phantom position thereof shown in FIG. 15. The uppermost flange thereon also will serve somewhat as a cutting edge to gradually shear and chop into the mass of material to be dislodged thereby.

In the event it is desired to use this embodiment of mechanism to remove the remaining accumulated material adjacent the periphery of the bottom wall 14, similar to the accumulated mass outlined by the curved line 107 in FIG. 1, for example, the blades 122 may be removed from the upper pivot brackets 124 and connected to the lower pivot brackets 124, initially being disposed in the upper illustrated position. As rotation progresses, they will gradually lower to the horizontal, lower position thereof illustrated in FIG. 15. Access to the interior of the shell 12 to accomplish this may be obtained through man hole 32 after removing closure 34. Removal of a limited amount of material from the bottom will be required to complete access to the interior for such reversal of the members 122. A side elevation showing details of at least the uppermost pivot brackets 124 are illustrated to advantage in FIG. 17.

Figure 17:
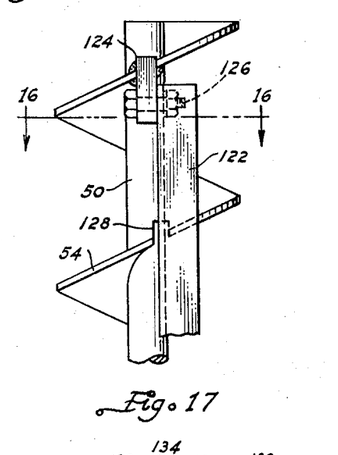
FIG. 17 is a fragmentary side elevation of the embodiment of agitating means shown in FIGS. 15 and 16.
Figure 19:
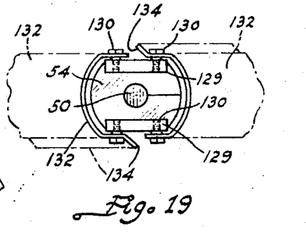
FIG. 19 is a transverse sectional view of the agitating mechanism shown in FIG. 18 as seen on the line 19—19 of said figure.

One further example of radially extendable dislodging members which are somewhat similar to the embodiments shown in FIGS. 15–17, is illustrated in FIGS. 18 and 19. In this embodiment, the shaft 50 and spiral flight 54, adjacent the upper end of said flight, are provided with a pair of substantially parallel, horizontally extending pivot or bracket blocks 129 which are appropriately fixed such as by welding, to recesses within the periphery of flight 54 for example. Transversely aligned pivot holes are formed in opposite ends of said pairs of blocks 129, as illustrated in FIG. 19, for purposes of receiving pivot pins 130. In this embodiment, the dislodging members are elongated rigid elements 132 and, in cross section, as shown in FIG. 19, preferably are approximately semi-circular. The upper ends of the side edge portions of said members are pivotally connected by said pins 130 to blocks 129.

When the shaft and spiral flight are rotated in the direction of the arrow shown in FIG. 19, it is preferred that the leading side edge 134 of each member be somewhat flared outwardly to constitutes a cutting edge which digs and bites into the lower surface of the compacted mass of material within the shell 12 as the discharge means is operated. Initially, the members 132 extend downwardly from their pivots 130 and somewhat enclose the auger 54. However, as rotation commences and the leading edges 134 commence to bite and dig into the accumulated material for movement of the same through discharge opening 26, centrifugal force will gradually throw the lower ends of members 132 outwardly until they reach the maximum extended operative position which is substantially horizontal. If desired, the upper ends of members 132 may be provided with serrations or the like, not shown, to prevent clogging between said upper ends as the members approach the uppermost positions thereof.

Figure 6:
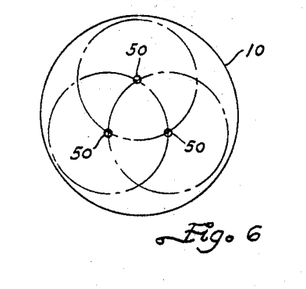
FIG. 6 is a diagrammatic arrangement illustratng the manner in which the present invention might be adapted to silos of a size somewhat larger than the type represented by the illustration in FIG. 1.
Figure 7:
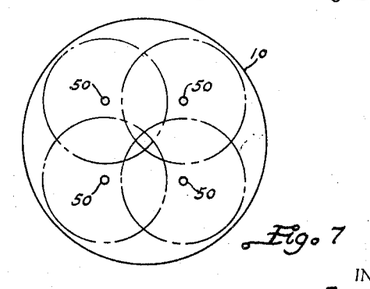
FIG. 7 is another diagrammatic view similar to FIG. 6 but illustrating an exemplary manner of adapting the invention to a still larger type of silo than that illustrated in FIG. 1.

Approximate diameters of silos capable of being equipped with the unloading mechanism comprising the present invention are set forth hereinabove. In general, silos up to about 20' in diameter can be serviced with a single unit of the various types described. However, larger diameter silos can be provided with the unloader mechanism of the invention by employing a plurality of such units if arranged in patterns such as illustrated in exemplary manner in FIGS. 6 and 7 which respectively pertain to silos up to about 30' diameter and in excess of 30' diameter.

We claim:

1. A silo for agricultural crop material comprising an upstanding cylindrical shell and top sealably connected thereto in air-tight relationship and a bottom wall extending across the lower end of said shell and having a substantially central discharge opening therein, in combination with discharge means comprising a vertical shaft extending upwardly through said opening into the interior of said shell a distance substantially less than the height of the shell, bearings arranged to support the lower end portion of said shaft for rotation substantially about the axis of said cylindrial shell, auger-like means of substantial diameter and coarse pitch connected to said shaft and operable to extend upward into the lower portion of stored material in said shell when loaded therewith, power means to rotate said shaft and auger-like means in a direction to feed material downward through said discharge opening, a plurality of radially extendable dislodging members having a length not in excess of the radius of said shell and comprising a plurality of lengths of chain interconnected at one end to said shaft at axially spaced locations on said shaft and auger-like means, weights on the outer ends of said chains operable to initiate outward movement of said chains from an initial depending position by centrifugal force during rotation of said shaft and auger-like means, the uppermost chains being longer than the lower chains and none of said chains being engageable with the inner surface of said shell when in fully extended position, pump means operable to pump air and having inlet and discharge means, conduit means connecting the inlet of said pump with the interior of said shell to produce a negative pressure within said shell to minimize degenerative chemical action within material within said shell, a housing depending from the bottom wall of said shell below said central discharge opening therein, discharge conduit means communicating with and extending laterally outward from said housing, and suction conduit means also extending from said housing to said inlet of said pump.

2. The silo according to claim 1 further including pressure control means connected to the interior of said housing depending from the bottom wall of said shell and responsive to changes in pressure on the interior of said shell and operable automatically to actuate said pump means when the pressure within said shell reaches a predetermined level, whereby the operation of said pump will reduce said pressure on the interior of said shell to a lower predetermined level and thereby maintain the pressure within said shell at negative levels between predetermined upper and lower limits at all times during storage operation of said silo.

3. A silo for agricultural crop material comprising an upstanding cylindrical shell and top sealably connected thereto in air-tight relationship and a bottom wall extending across the lower end of said shell and having a substantially central discharge opening therein, in combination with discharge means comprising a vertical shaft extending upwardly through said opening into the interior of said shell a distance substantially less than the height of the shell, bearings arranged to support the lower end portion of said shaft for rotation substantially about the axis of said cylindrical shell, auger-like means of substantial diameter and coarse pitch connected to said shaft and operable to extend upward into the lower portion of stored material in said shell when loaded therewith, power means to rotate said shaft and auger-like means in a direction to feed material downward through said discharge opening, a plurality of radially extending dislodging blade members freely pivotally connected at one end thereof to said auger-like means adjacent the upper end thereof, said members extending downward from the pivots thereof substantially into parallelism with said shaft when said members are inoperative and said members also having a length not in excess of the radius of said shell, a vertically short substantially circular discharge housing below the bottom wall of said shell and coaxial with said discharge opening to receive material from said discharge opening, a discharge conduit communicating with and extending outward from said housing, an impeller within said conduit, and means to rotate said impeller to impel material through said conduit in loose condition.

4. The silo according to claim 3 in which said bladelike members are semi-circular in cross-section and have substantially parallel side edge portions, and said shaft being provided with hub means on said shaft adjacent the upper end of said auger-like means, the opposite side edge portions of the pivoted ends of said blades being pivotally connected to said pivot hub on a common axis extending transversely through said opposite side edge portions and hub means.

5. The silo according to claim 4 in which the leading side edge of each semi-circular blade in the direction of rotation thereof is flared outwardly a limited extent to serve as a cutting edge engageable with the material to be discharged from said silo when said blades are being revolved by the shaft supporting the same.

6. The silo according to claim 3 in which said blade-like members comprise angle structural members and at least one flange on each member serving as a cutting edge in operation to engage the material to be discharged from said shell.

7. The silo according to claim 6 in which the flights of said auger-like means have vertically aligned slots extending radially inward and operable to receive one flange of each of said blade members when said blades are retracted to inoperative position.

8. The silo according to claim 6 further including alternate connecting means on said shaft adjacent the bottom of said shell and arranged to have the pivoted ends of said blade-like members pivotally connected thereto when disconnected from the pivot means adjacent the upper end of said auger means and thereby being operable when extended in operative position to dislodge material from adjacent the bottom of said shell for substantially the full width thereof.

9. The silo according to claim 8 further including an access opening in the bottom wall of said shell comprising a man hole to permit an operator to effect disconnection and connection of said blades between the upper pivot means and the alternative connecting means on said shaft, and a closure member for said man hole operable to seal the same when discharging operations are in operation.

References Cited
UNITED STATES PATENTS

| | | | |
|---|---|---|---|
| 391,907 | 10/1888 | Merrill | 222—227 X |
| 1,859,290 | 5/1932 | Davis | 222—227 X |
| 2,228,421 | 1/1941 | Taylor | 222—228 |
| 2,503,233 | 4/1950 | Hall | 222—242 |
| 2,551,217 | 5/1951 | Martin | 222—152 X |
| 2,576,620 | 11/1951 | Martin | 222—228 |
| 2,692,067 | 10/1954 | Hapman | 222—152 X |
| 2,722,171 | 11/1955 | Deringer | 99—235 |
| 2,899,884 | 8/1959 | Herbruck | 99—235 |
| 3,067,914 | 12/1962 | Ellaby | 222—227 |
| 3,223,290 | 12/1965 | Schuld | 222—228 |

WALTER SOBIN, *Primary Examiner.*

U.S. Cl. X.R.

99—235; 222—152, 183, 184, 227, 228, 240, 333